(12) United States Patent
Rondepierre et al.

(10) Patent No.: US 11,477,023 B2
(45) Date of Patent: Oct. 18, 2022

(54) METHOD AND DEVICE FOR CRYPTOGRAPHIC PROCESSING OF DATA

(71) Applicant: IDEMIA France, Courbevoie (FR)

(72) Inventors: Franck Rondepierre, Courbevoie (FR); Luk Bettale, Courbevoie (FR)

(73) Assignee: IDEMIA FRANCE, Courbevoie (FR)

( * ) Notice: Subject to any disclaimer, the term of this patent is extended or adjusted under 35 U.S.C. 154(b) by 611 days.

(21) Appl. No.: 16/197,486

(22) Filed: Nov. 21, 2018

(65) Prior Publication Data

US 2019/0165940 A1 May 30, 2019

(30) Foreign Application Priority Data

Nov. 30, 2017 (FR) ...................................... 1761459

(51) Int. Cl.
*H04L 9/16* (2006.01)
*H04L 9/00* (2022.01)
(Continued)

(52) U.S. Cl.
CPC .............. *H04L 9/16* (2013.01); *G06F 21/602* (2013.01); *G09C 1/00* (2013.01); *H04L 9/003* (2013.01);
(Continued)

(58) Field of Classification Search
CPC .......... H04L 9/16; H04L 9/004; G06F 21/602
(Continued)

(56) References Cited

U.S. PATENT DOCUMENTS

| 7,848,515 B2 | 12/2010 | Dupaquis et al. |
| 8,386,791 B2 * | 2/2013 | Bevan ................... H04L 9/0618 713/179 |

(Continued)

FOREIGN PATENT DOCUMENTS

| FR | 2 867 635 A1 | 9/2005 |
| FR | 2 893 796 A1 | 5/2007 |

(Continued)

OTHER PUBLICATIONS

Paolo Maistri: "Advanced Encryption Standard Secured Architecture and its Auto-Test Capabilities", Dec. 16, 2008 (Dec. 16, 2008), XP055497488, Extrait de l'Internet: URL:http://www-verimag.imag.frrasync/CCIS/talks08/PaoloMaistri.pdf [extrait le Aug. 6, 2018] * pp. 28-30 *.

(Continued)

*Primary Examiner* — Teshome Hailu
(74) *Attorney, Agent, or Firm* — Nixon & Vanderhye

(57) ABSTRACT

A method for cryptographic processing includes: storing an initial value as the current value; implementing a predetermined number of first steps, including one involving obtaining second data by applying a first cryptographic algorithm to first data, the others each involving the application of the first cryptographic algorithm to the current value and the storage of the result as the new current value; implementation of the predetermined number of second steps, including one involving the obtaining of fourth data by applying, to third data, a second cryptographic algorithm that is the inverse of the first cryptographic algorithm, the others each involving the application of the second cryptographic algorithm to the current value and the storage of the result as the new current value; and verification of the equality of the first data and the fourth data, and of the equality of the current value and the initial value.

17 Claims, 2 Drawing Sheets

(51) Int. Cl.
   *H04L 9/32*   (2006.01)
   *G09C 1/00*   (2006.01)
   *G06F 21/60*  (2013.01)

(52) U.S. Cl.
   CPC ............ *H04L 9/004* (2013.01); *H04L 9/3228* (2013.01); *H04L 2209/12* (2013.01)

(58) Field of Classification Search
   USPC .......................................................... 380/28
   See application file for complete search history.

(56) References Cited

U.S. PATENT DOCUMENTS

| | | | |
|---|---|---|---|
| 8,694,467 B2* | 4/2014 | Sun .................... | G06F 16/10 707/640 |
| 10,503,582 B2* | 12/2019 | Rosenblattl ......... | G06F 11/1004 |
| 2004/0049468 A1* | 3/2004 | Walmsley .......... | G06Q 20/3674 705/76 |
| 2004/0196980 A1* | 10/2004 | Turner ................. | G07C 9/27 380/270 |
| 2007/0106852 A1* | 5/2007 | Lam .................... | G06F 11/2082 711/154 |
| 2007/0177720 A1* | 8/2007 | Bevan ................. | H04L 9/0618 380/28 |
| 2011/0246433 A1* | 10/2011 | Sun ........................ | G06F 16/10 707/698 |
| 2014/0298456 A1* | 10/2014 | Colonel .............. | H04W 12/128 726/22 |
| 2014/0351603 A1 | 11/2014 | Feix et al. | |
| 2015/0026783 A1* | 1/2015 | Tseng .................... | H04W 12/06 726/6 |
| 2018/0253352 A1* | 9/2018 | Rosenblattl ......... | G06F 11/0796 |

FOREIGN PATENT DOCUMENTS

| | | |
|---|---|---|
| FR | 2 986 092 A1 | 7/2013 |
| FR | 2985624 | 7/2013 |
| WO | 2017/080769 | 5/2017 |

OTHER PUBLICATIONS

Wu K et al: "Concurrent error detection of fault-based side-channel cryptanalysis of 128-bit RC6 block cipher", Microelectronics Jour, Mackintosh, Publications Ltd. Luton, GB, vol. 34, No. 1, Jan. 1, 2003 (Jan. 1, 2003), pp. 31-39, XP004404368 ISSN: 0026-2692, DOI 10.1016/S0026-2692(02)00126-X section 4.1; figure 5.
FR Search Report, dated Dec. 12, 2013, from corresponding FR 1 761 459 application.

* cited by examiner

METHOD AND DEVICE FOR CRYPTOGRAPHIC PROCESSING OF DATA

FIELD OF THE INVENTION

The present invention relates in general to the field of cryptographic processing of data.

It relates more particularly to a method and a device for cryptographic processing of data.

BACKGROUND OF THE INVENTION

Protection is sought for the cryptographic processing of data against attacks that are aimed at revealing the secrets (in general a cryptographic key) used during this cryptographic processing and thus fraudulently using these secrets.

For this purpose, it has already been devised to design the cryptographic algorithms that manipulate the data in such a way as to prevent any leak of information related to the data manipulated.

In certain situations, however, the design of the cryptographic algorithms is fixed, as is the case when a dedicated electronic circuit (programmed in a fixed manner) is used for the implementation of these cryptographic algorithms.

In this type of situation, the following measures are generally planned for protection against attacks:
  the useful implementation of the cryptographic algorithm is hidden among a plurality of fake implementations of this cryptographic algorithm;
  the absence of faults in the processing is verified, preferably by seeking to return the initial data by applying an inverse algorithm.

BRIEF SUMMARY OF THE INVENTION

In this context, the present invention proposes a method for cryptographic processing of first data, comprising the following steps:
  storage of an initial value as a current value;
  implementation of a predetermined number of first steps, one of said first steps involving the obtaining of second data by applying a first cryptographic algorithm to the first data, the other of said first steps each involving the obtaining of a result by applying the first cryptographic algorithm to the current value and the storage of the result as the new current value;
  implementation of the predetermined number of second steps, one of said second steps involving the obtaining of fourth data by applying, to third data, a second cryptographic algorithm that is the inverse of the first cryptographic algorithm, the other of said second steps each involving the obtaining of another result by applying the second cryptographic algorithm to the current value and the storage of the other result as the new current value;
  verification of the equality of the first data and the fourth data, and of the equality of the current value and the initial value.

The effective implementation of the first cryptographic algorithm (and of the second algorithm, respectively), applied to the first data (and to the third data, respectively), is thus hidden in fake executions of this first cryptographic algorithm (and of the second cryptographic algorithm, respectively), applied to the current value.

The symmetrical implementation of the first cryptographic algorithm and of its inverse (second cryptographic algorithm) also allows the absence of errors (and thus of an attack) during the effective processing to be verified by comparing the first data and the fourth data.

Moreover, since the first cryptographic algorithm and its inverse (second cryptographic algorithm) are applied the same number of times to the current value, it is possible to verify the absence of errors (and thus of an attack) during the fake processing by comparing the initial value and the resulting current value after the implementation of the first steps and of the second steps.

Other non-limiting features of the method for cryptographic processing according to the invention, taken alone or according to all the technically possible combinations, are the following:
  the method comprises a step of randomly determining, among the first steps, the step involving the obtaining of the second data, and/or a step of randomly determining, among the second steps, the step involving the obtaining of the fourth data, which allows the effective processing to be hidden even more effectively in the fake processing (without this having a negative effect on the verification step);
  the method comprises a previous step of randomly determining the initial value;
  the first data represents a message or an initial word (also called "initialization vector");
  the first algorithm is an encryption algorithm;
  the first algorithm uses a cryptographic key;
  the first algorithm is an AES algorithm;
  the method comprises, in the case of equalities between the first data and the fourth data and between the current value and the initial value during the verification step, a step of emitting a piece of data obtained depending on the second data;
  the method comprises a step of implementing a security action if the first data differs from the fourth data or if the current value differs from the initial value during the verification step;
  the third data is the second data, which is the case when the processing of the first data only involves applying the first cryptographic algorithm (as in the case of the first embodiment described below in reference to FIG. 2).

According to another possible embodiment, the method can further comprise the following steps:
  obtaining fifth data by applying a third cryptographic algorithm to the second data;
  obtaining sixth data by applying a fourth cryptographic algorithm to the fifth data;
  obtaining seventh data by applying, to the sixth data, a fifth cryptographic algorithm that is the inverse of the fourth cryptographic algorithm;
  obtaining the third data by applying, to the seventh data, a sixth cryptographic algorithm that is the inverse of the third cryptographic algorithm. This is the case for example when the processing of the first data involves applying a "Triple DES" algorithm, as described below as the first possible use of the second embodiment shown in FIG. 3.

According to yet another possibility (which corresponds to the second use, described below, of the second embodiment), the method can further comprise the following steps, the second data being used as current data:
  implementation of a second predetermined number of third steps each involving the obtaining of a result by applying the first cryptographic algorithm to the current data and the storage of the result as the new current data;

implementation of the second predetermined number of fourth steps each involving the obtaining of another result by applying the second cryptographic algorithm to the current data and the storage of the other result as the new current data, said third data being the current data after implementation of said fourth steps. In this case, the processing of the first data involves a plurality of successive applications of the same cryptographic algorithm (the first cryptographic algorithm), for example the AES algorithm in the case of block encryption (as described below).

The invention also proposes a device for cryptographic processing of first data, comprising a processor programmed to:

store an initial value as a current value;
implement a predetermined number of first steps, involving, during one of said first steps, an application of a first cryptographic algorithm to the first data in such a way as to obtain second data and, during each of the other of said first steps, an application of the first cryptographic algorithm to the current value in such a way as to obtain a result and a storage of the result as the new current value;
implement the predetermined number of second steps, involving, during one of said second steps, an application, to third data, of a second cryptographic algorithm that is the inverse of the first cryptographic algorithm in such a way as to obtain fourth data and, during each of the other of said second steps, an application of the second cryptographic algorithm to the current value in such a way as to obtain another result and a storage of the other result as the new current value;
verify the equality of the first data and the fourth data, and the equality of the current value and the initial value.

Such a device can for example comprise a cryptoprocessor.

The application of the first cryptographic algorithm and/or the application of the second cryptographic algorithm can thus be implemented by the cryptoprocessor upon command of the processor.

BRIEF DESCRIPTION OF THE DRAWINGS

The description given below in comparison to the appended drawings, given as non-limiting examples, will make clear what the invention involves and how it can be carried out.

In the appended drawings.

DETAILED DESCRIPTION OF EMBODIMENTS OF THE INVENTION

Figure 1:
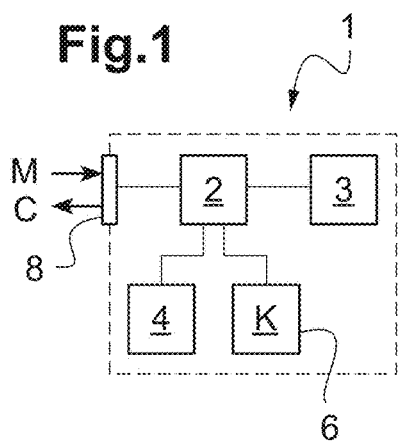
FIG. 1 is a diagram of the main elements of a device in which the invention is implemented.

FIG. 1 is a diagram of the main elements of a device for cryptographic processing of data, here an electronic unit 1, in which the invention is implemented. This electronic unit is for example a microcircuit card, for example a universal integrated circuit card (or UICC). Alternatively, it could be a secure element (or SE)—for example a secure microcontroller, a mobile electronic device (or hand-held electronic device)—for example a communication terminal or an electronic passport, or a computer.

The electronic unit 1 comprises a processor 2 (here a microprocessor), a random-access memory 4 and a rewritable non-volatile memory 6 (for example EEPROM or "Electrically Erasable and Programmable Read-Only Memory"). The electronic unit 1 could optionally further comprise a read-only memory. The random-access memory 4 and the rewritable non-volatile memory 6 (and if necessary the read-only memory) are each linked to the processor 2 in such a way that the processor 2 can read or write data in each of these memories.

One of these memories, for example the rewritable non-volatile memory 6, stores computer program instructions that allow the implementation of at least one of the methods described below in reference to FIGS. 2 to 3 when these instructions are executed by the processor 2.

The memories 4, 6 also store data representative of values used during the implementation of the methods described below. For example, the rewritable non-volatile memory 6 stores a cryptographic key K.

Moreover, the random-access memory 4 stores, for example in variables, data processed during the methods described below.

Moreover, here, the electronic unit 1 comprises a cryptoprocessor 3.

The cryptoprocessor 3 is designed to apply a cryptographic algorithm F to data input from the processor 2 and to output (to the processor 2) the result of the application of this cryptographic algorithm F.

The cryptographic algorithm F is for example a DES algorithm or an AES algorithm. The cryptographic algorithm F can be an encryption algorithm, or a decryption algorithm, or a signature algorithm, or a signature-verification algorithm.

Alternatively, the electronic unit 1 could not comprise such a cryptoprocessor, in which case the processor 2 itself is designed to implement the aforementioned cryptographic algorithm F. In this case, the non-volatile memory 6 stores instructions designed to implement such a cryptographic algorithm F when these instructions are executed by the processor 2.

The electronic unit 1 further comprises an interface 8 for communication with external electronic devices. In the case described here in which the electronic unit 1 is a microcircuit card, the communication interface 8 comprises for example contacts flush with a face of the microcircuit card. Alternatively, the communication interface 8 could be made by a contactless communication module. In general, the communication interface 8 can be a module for (wired or wireless) communication with another electronic unit.

The processor 2 can thus receive data, for example a message M, coming from the other electronic unit via the communication interface 8 and emit other data, for example a result of application of a cryptographic algorithm (such as one of those described below in reference to FIGS. 2 to 3) to the message M, to the other electronic unit via the communication interface 8.

Figure 2:
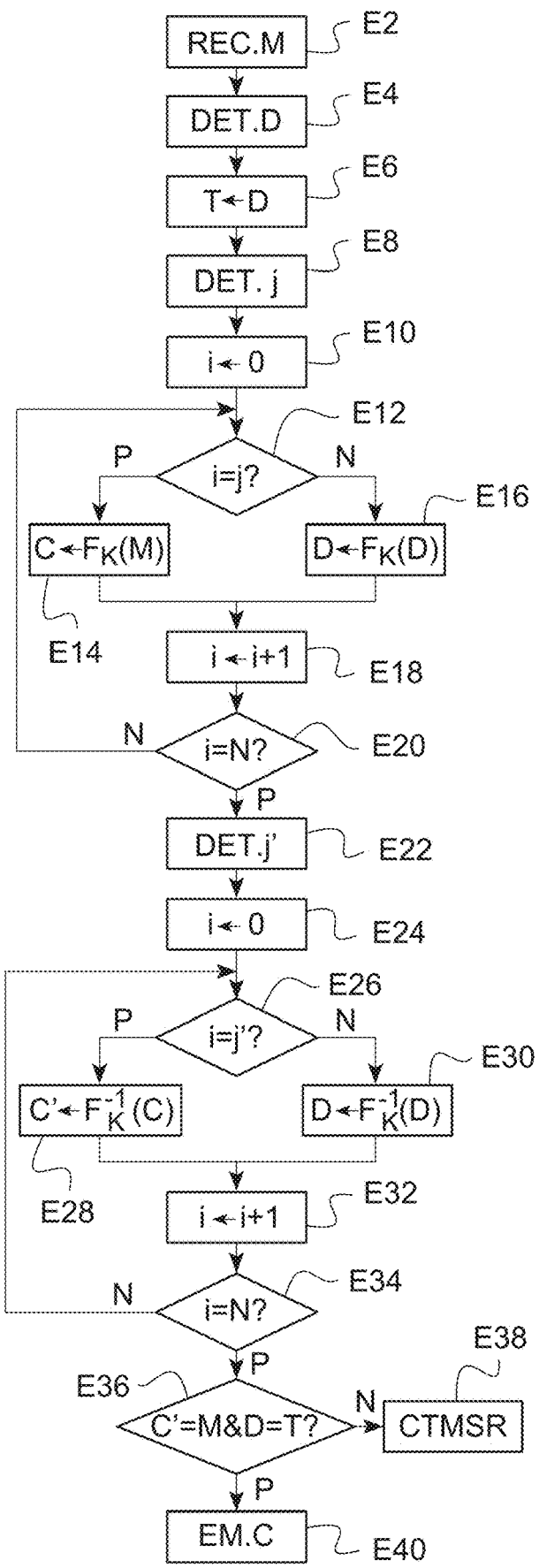
FIG. 2 shows, in the form of a flowchart, a first example of a method according to the invention.

FIG. 2 shows, in the form of a flowchart, a first example of a method according to the invention.

This method begins with the step E2 in which the processor 2 receives, via the communication interface 8, the message M to be processed.

The processor 2 then determines a fake message (or dummy message), for example via random number selection (step E4), and stores this message in a variable D (for example in random-access memory 4). The fake message thus determined and stored in the variable D has an identical format (for example an identical number of bits) to the message M received in step E2.

The processor 2 stores the fake message determined in step E4 (that is to say, the initial state of the variable D), for example in the random-access memory 4, here as a variable T (step E6).

The processor 2 then determines, via random number selection, an integer j between 0 and N-1 (step E8), where N is a predetermined number that represents the number of iterations carried out for an effective application of the cryptographic algorithm F, as described below.

The processor 2 then initializes, to zero, a counter i (step E10), that is to say, a variable i, the value of which increases with the iterations as described below.

The method then enters a loop in step E12 in which the processor 2 determines whether the current value of the counter i is equal to the (random) integer j determined in step E8.

In the affirmative case (arrow P), the processor 2 orders the cryptoprocessor 3 to apply, to the message M, the cryptographic algorithm F using the cryptographic key K (step E14). The result of this application of the cryptographic algorithm F to the message M is stored, for example in random-access memory 4, here in a variable C.

In the example described here, the cryptographic key K is stored in the non-volatile memory 6; the cryptographic key K is consequently transmitted by the processor 2 to the cryptoprocessor 3 (with the message M) for implementation of the step E14. Alternatively, the cryptographic key K could be stored in the cryptoprocessor 3 (the processor 2 thus only transmitting the message M to the cryptoprocessor 3).

According to another alternative already mentioned, the processor 2 itself applies the cryptographic algorithm F (using the cryptographic key K) to the message M.

In the negative case in the step E12 (arrow N), the processor 2 orders the cryptoprocessor 3 to apply the cryptographic algorithm F using the cryptographic key K to the current value of the variable D; the processor 2 stores the result of the application of the cryptographic algorithm F to the variable D as the new current value in this same variable D with overwriting (step E16).

Alternatively, as already indicated, the processor 2 could itself apply the cryptographic algorithm F (using the cryptographic key K) to the current value of the variable D.

In both cases (step E14 or step E16), the method continues in step E18 in which the processor 2 increments the counter i.

The processor 2 then determines whether the counter i has reached the (predetermined) value N (step E20).

In the negative case (arrow N), the method loops to step E12 for implementation of the following iteration.

In the affirmative case (arrow P), the method continues in the step E22 described below.

It is understood that, via the steps described just above, an effective application of the cryptographic algorithm F to the message M and N-1 applications of this cryptographic algorithm F to the variable D are implemented. The iteration (out of the N iterations) corresponding to the effective application of the cryptographic algorithm F to the message M varies, however, upon each implementation of the method and in a random manner (via the random number selection of the variable j).

In step E22, the processor 2 determines, via random number selection, a whole number j' between 0 and N-1, where N is the predetermined number already mentioned.

The processor 2 then initializes the counter i to zero (step E24).

The method then enters a loop in step E26 in which the processor 2 determines whether the current value of the counter i is equal to the (random) integer j' determined in step E22.

In the affirmative case (arrow P), the processor 2 orders the cryptoprocessor 3 to apply, to the variable C, the algorithm $F^{-1}$ that is the inverse of the cryptographic algorithm F (step E28), by using here the same cryptographic key K. The result of this application of the inverse algorithm $F^{-1}$ to the variable C is stored, for example in random-access memory 4, here in a variable C'.

During normal operation (that is to say, in particular in the absence of an attack via a fault), due to the application of the cryptographic algorithm F to the message M with the variable C as the result and then the application of the inverse algorithm $F^{-1}$ to the variable C in order to obtain the variable C', the variable C' must be equal to the message M (which is verified in step E36 described below).

Alternatively, as already indicated with regard to the cryptographic algorithm F, the processor 2 could itself apply the inverse algorithm $F^{-1}$ to the variable C.

In the negative case in step E26 (arrow N), the processor 2 orders the cryptoprocessor 3 to apply the inverse algorithm $F^{-1}$ to the current value of the variable D; the processor 2 stores the result of the application of the inverse algorithm $F^{-1}$ to the variable D as the new current value in this same variable D with overwriting (step E30).

Alternatively, as already indicated, the processor 2 could itself apply the cryptographic algorithm $F^{-1}$ to the current value of the variable D.

In both cases (step E28 or step E30), the method continues in step E32 in which the processor 2 increments the counter i.

The processor 2 then determines whether the counter i has reached the (predetermined) value N (step E34).

In the negative case (arrow N), the method loops to step E26 for implementation of the following iteration.

In the affirmative case (arrow P), the method continues in step E36 described below.

Here again, an effective application of the inverse algorithm $F^{-1}$ to the variable C (normally in order to return a variable C' identical to the message M) and N-1 applications of this inverse algorithm $F^{-1}$ to the variable D are implemented. The iteration (out of the N iterations) corresponding to the effective application of the inverse algorithm $F^{-1}$ to the variable C varies, however, upon each implementation of the method and in a random manner (via the random number selection of the variable j').

Moreover, since the variable D has undergone N-1 applications of the cryptographic algorithm F during the implementations of the step E16 and N-1 applications of the inverse algorithm $F^{-1}$ during the implementations of the step E30, the variable D should (during normal operation, that is to say, in particular in the absence of an attack via a fault) go back to its initial value (which was saved in the variable T in step E6).

The processor 2 thus verifies, in step E36, the equality between the variable C' and the message M on the one hand, and the equality between the current value of the variable D and the variable T on the other hand. This verification thus allows the normal operation to be verified not only during the iterations of processing of the message M, but also during the iterations of the processing of the fake message D.

If one or the other of the two aforementioned equalities is not verified, the processor 2 implements a step of error processing (step 38) allowing the implementation of at least one security action.

Such a step E38 of error processing comprises for example the writing of a piece of blocking data (or lock) into the rewritable non-volatile memory 6. The presence of a piece of blocking data in the rewritable non-volatile memory 6 prevents any later operation of the electronic unit 1. To do this, the processor 2 reads for example the zone of potential storage of the piece of blocking data during the startup of its operation and stops its operation in case of detection of the piece of blocking data.

Alternatively, the step E38 of error processing can include the writing, into the rewritable non-volatile memory 6, of data indicative of an error counter. When this error counter reaches a predetermined threshold, the processor 2 orders for example the writing, into the rewritable non-volatile memory 6, of a piece of blocking data as described above.

The step E38 of error processing can optionally further comprise the emission of an error message via the communication interface 8.

If the two aforementioned equalities are verified in step E36, the processor 2 can order the emission (step E40), via the communication interface 8, of the contents of the variable C (which corresponds as indicated in step E14 to the result of the application of the cryptographic algorithm F to the message M).

Figure 3:
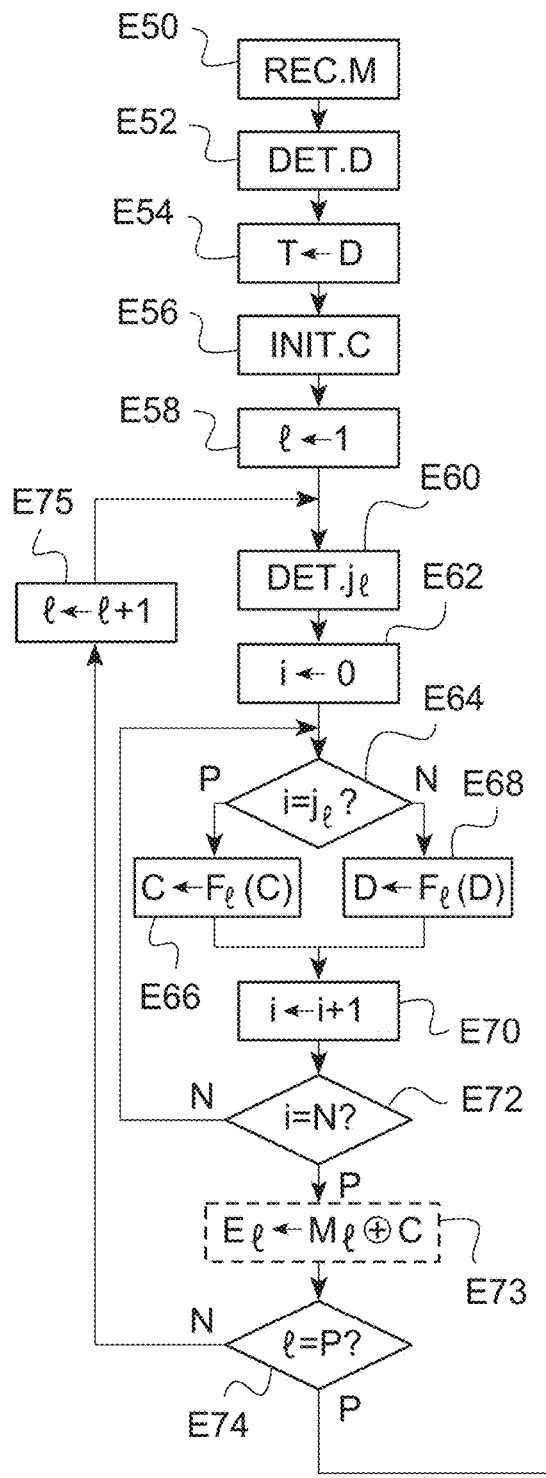
FIG. 3 shows, in the form of a flowchart, a second example of a method according to the invention.
Figure 3:
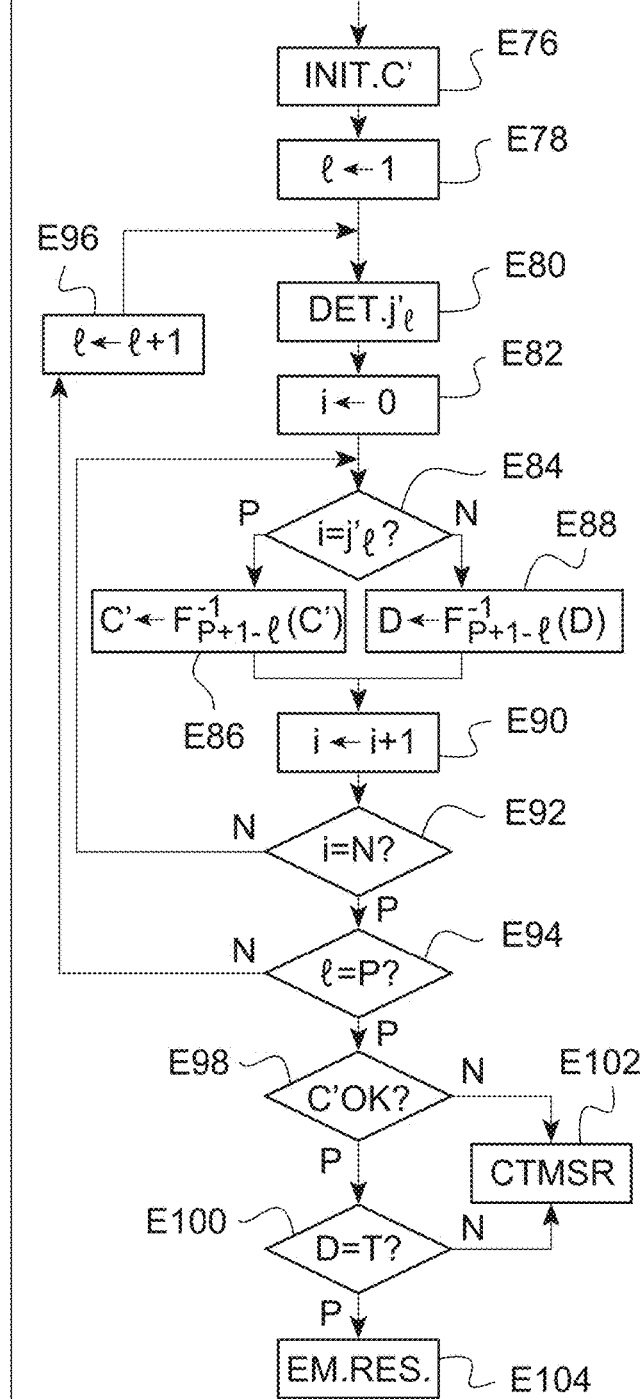

FIG. 3 shows, in the form of a diagram, a second example of a method according to the invention.

This second example is described below in two possible uses.

In a first use of this second example, a "Triple DES" cryptographic algorithm is implemented: starting with an input message M, three cryptographic functions $DES_1$, $DES_2$, $DES_3$ (here, with $DES_1=DES_2^{-1}=DES_3$) are successively applied, these three cryptographic functions respectively using different cryptographic keys $K_1$, $K_2$, $K_3$.

In a second use of this second example, block encryption in OFB mode (for "Output FeedBack") is implemented: an input message M is divided into P blocks $M_I$ and, starting from an initial word IV, P cryptographic algorithms (here, of the AES type) are successively applied, the result of the $I^{th}$ cryptographic algorithm being applied to the corresponding block $M_I$ via Boolean addition (or an exclusive or operation, or XOR) for the encryption of this block $M_I$.

In both uses, the method starts at step E50 with the reception of the message M by the processor 2, here via the interface 8.

The processor 2 then determines a fake message, for example via random number selection (step E52), and stores this message in a variable D (for example in random-access memory 4).

In the first use, the fake message has a length in bits equal to that of the message M. In the second use, the fake message has a length in bits equal to that of each block $M_I$ of the message M.

The processor 2 stores the fake message determined in step E52 (that is to say, the initial state of the variable D), for example in the random-access memory 4, here as a variable T (step E54).

The processor 2 then initializes, in step E56, a variable C intended to undergo the successive application of the cryptographic algorithms $F_I$ in the sequence as described below (these algorithms $F_I$ being $DES_I$ algorithms in the first use and the AES algorithm in the second use).

Thus, in the first use, the variable C is initialized with the message M received in step E50. In the second use, the variable C is initialized with the initial word IV (generally designated as "initialization vector"). This initial word IV is predefined for the block encryption scheme in question and can therefore be stored for example in the non-volatile memory 6 (just like the cryptographic key K used during the application of the AES cryptographic algorithm as explained below). Alternatively, the initial word IV can be received (optionally with the message M, that is to say, in step E50) via the communication interface 8.

The processor 2 then initializes an index variable I to the value 1 (step E58).

The processor 2 then determines, via random number selection, an integer $j_I$ between 0 and N-1 (step E60). Like in the first example described in reference to FIG. 2, the number N is predefined. For a given cryptographic algorithm $F_I$, this number N represents the total number of applications of this cryptographic algorithm $F_I$ for an effective application of this algorithm $F_I$ to the piece of data to be processed (variable C).

The processor 2 then initializes, to zero, a counter i (step E62), that is to say, a variable i, the value of which increases with the iterations as described below.

The processor 2 determines, in step E64, whether the current value of the counter i is equal to the (random) integer $j_I$ determined in step E60.

In the affirmative case (arrow P), the processor 2 orders the cryptoprocessor 3 to apply, to the variable C, the cryptographic algorithm $F_I$ (step E66). The processor 2 stores the result of this application of the cryptographic algorithm $F_I$ to the variable C in the variable C itself, with overwriting.

Like for the first example, it is alternatively possible for the processor 2 to itself apply the cryptographic algorithm $F_I$.

In the first possible use, the algorithm $F_I$ is the $DES_I$ algorithm mentioned above (I can vary between 1 and 3 in this first use) using the cryptographic key $K_I$ (this cryptographic key $K_I$ can for example be stored in the non-volatile memory 6).

In the second possible use, the cryptographic algorithm $F_I$ is the AES algorithm using the cryptographic key K (stored here in non-volatile memory 6). Thus, in this second use, the cryptographic algorithm $F_I$ is the same regardless of the value of the index I in question.

In the negative case in step E64 (arrow N), the processor 2 orders the cryptoprocessor 3 to apply the cryptographic algorithm $F_I$ to the current value of the variable D; the processor 2 stores the result of the application of the cryptographic algorithm $F_I$ to the variable D as the new current value in this same variable D with overwriting (step E68).

Alternatively, as already indicated, the processor 2 could itself apply the cryptographic algorithm $F_I$ to the current value of the variable D.

In both cases (step E66 or step E68), the method continues in step E70 in which the processor 2 increments the counter i.

The processor 2 then determines whether the counter i has reached the (predetermined) value N (step E72).

In the negative case (arrow N), the method loops to step E64 for implementation of the following iteration.

In the affirmative case (arrow P), the N implementations of the cryptographic algorithm $F_I$ are carried out (only one being effective, the others being fake).

In the case of the second use, the processor 2 thus implements an exclusive or operation (or XOR) between the current value of the variable C (which stores the result of the last effective application of the cryptographic algorithm $F_I$, here the AES algorithm) and of the current block $M_I$ of the message M, which allows the current encrypted block $E_I$ to be obtained ($E_I = M_I \oplus C$).

The processor 2 then determines whether the index variable I corresponds to the last index (having a value P) to be processed (step E74). In the first possible use, the predetermined value P is equal to 3 (corresponding to the 3 cryptographic algorithms $DES_1$, $DES_2$, $DES_3$ successively applied). In the second possible use, the value P corresponds to the number of blocks $M_I$ forming the message M, as already indicated.

In the negative case in step E74 (arrow N), the index variable I is incremented in step E75 and the method loops to the step E60 already described.

In the affirmative case in step E74 (arrow P), all the cryptographic algorithms $F_I$ have been applied to the variable C and the method continues in step E76 now described to start a processing phase that allows correct operation during the preceding steps to be verified.

In step E76, the processor 2 initializes a variable C' (to which P cryptographic algorithms $F_{P+1-I}^{-1}$, respectively inverses of the cryptographic algorithms $F_{P+1-I}$, are successively applied).

In both of the uses described here, it is sought to return (after application of these P inverse algorithms $F_{P+1-I}^{-1}$) the initial state of the variable C in order to verify the absence of errors (and thus of an attack) in the processing. The processor 2 thus initializes (in both uses) the variable C' with the current value of the variable C.

The processor 2 then initializes, to the value 1, an index variable I (step E78).

The processor 2 then determines, via random number selection, an integer $j'_I$ between 0 and N-1 (step E80).

The processor 2 then initializes the counter i to zero (step E82).

The processor 2 determines in step E84 whether the current value of the counter i is equal to the (random) integer $j'_I$ determined in step E80.

In the affirmative case (arrow P), the processor 2 orders the cryptoprocessor 3 to apply, to the variable C', the cryptographic algorithm $F_{P+1-I}^{-1}$ (step E86). The processor 2 stores the result of this application of the cryptographic algorithm $F_{P+1-I}^{-1}$ to the variable C' in the variable C' itself, with overwriting.

Like for the first example, it is alternatively possible for the processor 2 to itself apply the cryptographic algorithm $F_{P+1-I}^{-1}$.

In the first possible use, the algorithm $F_{P+1-I}^{-1}$ is the inverse algorithm of the $DES_{P+1-I}$ algorithm mentioned above (I can vary between 1 and 3 in this first use) using the cryptographic key $K_{P+1-I}$.

In the second possible use, the algorithm $F_{P+1-I}^{-1}$ is the inverse algorithm of the AES algorithm using the cryptographic key K.

In the negative case in step E84 (arrow N), the processor 2 orders the cryptoprocessor 3 to apply the cryptographic algorithm $F_{P+1-I}^{-1}$ to the current value of the variable D; the processor 2 stores the result of the application of the cryptographic algorithm $F_{P+1-I}^{-1}$ to the variable D as the new current value in this same variable D with overwriting (step E88).

Alternatively, as already indicated, the processor 2 could itself apply the cryptographic algorithm $F_{P+1-I}^{-1}$ to the current value of the variable D.

In both cases (step E86 or step E88), the method continues in step E90 in which the processor 2 increments the counter i.

The processor 2 then determines whether the counter i has reached the (predetermined) value N (step E92).

In the negative case (arrow N), the method loops to step E84 for implementation of the following iteration.

In the affirmative case (arrow P), the N implementations of the inverse algorithm have been carried out (only one being effective, the others being fake).

The processor 2 then determines whether the index variable I corresponds to the last index (having a value P) to be processed (step E94).

In the negative case in step E94 (arrow N), the index variable I is incremented in step E96 and the method loops to the step E80 already described.

In the affirmative case in step E94 (arrow P), all the inverse cryptographic algorithms $F_{P+1-I}^{-1}$ have been applied to the variable C' and the method continues in step E98 now described.

The processor 2 verifies in step E98 whether the variable C' is equal to the expected value during normal operation, that is to say, whether, by successively applying the inverse algorithms $F_{P+1-I}^{-1}$ (in the successive passages in step E86), the initialization value of the variable C in step E56 is returned.

Thus, in the first use, the processor 2 verifies in step E98 whether the contents of the variable C' are identical to the received message M.

In the second use, the processor 2 verifies in step E98 whether the contents of the variable C' are identical to the initial word IV.

In the case of negative verification in step E98 (which occurs in the case of a processing error during the method, the origin of which can be an attack), the processor implements a step of error processing (step E102) allowing the implementation of at least one security action. This step of error processing is identical to the step E38 described above in reference to FIG. 2 and will not therefore be described again.

In the case of positive verification in step E98, the processor 2 verifies, in step E100, the equality between the contents of the variable D and the contents of the variable T. Indeed, the variable D (the initial value of which was saved in the variable T) has undergone (N-1) applications of each of the cryptographic algorithms $F_I$, then (N-1) applications of each of the inverse algorithms (taken in the reverse order), in such a way that the variable D returns to its initial state during normal operation.

In the case of negative verification in step E100 (which occurs in the case of a processing error during the method, the origin of which can be an attack), the processor implements the step E102 of error processing already mentioned.

In the case of positive verification in step E100, correct operation has been verified during the steps of effective application of the algorithms (in step E98) and during the steps of fake application of the algorithms (in step E100); the processor 2 can then order the emission, via the interface 8, of the result of the processing described above (step E104).

In the first use, this result is the contents of the variable C.

In the second use, this result is the encrypted message formed by the set of the encrypted blocks $E_I$ (respectively obtained during the successive passages in step E73).

The invention claimed is:

1. A method for cryptographic processing of first data, comprising the following consecutive steps:
storing an initial value in a variable as a current value of the variable, the initial value being different from the first data;
implementing a plurality of first steps that each apply a first cryptographic algorithm in succession with one another, one of said first steps comprised of applying the first cryptographic algorithm to the first data and storing a result of said one of said first steps as second data, and all other ones of said first steps each comprised of applying the first cryptographic algorithm to the current value of the variable and applying a result therefrom to replace the current value of the variable;
implementing a plurality of second steps, equal to the plurality of first steps, that each apply a second cryptographic algorithm in succession with one another, the second cryptographic algorithm being inverse of the first cryptographic algorithm, one of said second steps comprised of applying the second cryptographic algorithm to third data and storing a result of said one of said second steps as fourth data, and all other ones of said second steps each comprised of applying the second cryptographic algorithm to the current value of the variable and applying a result therefrom to replace the current value of the variable; and
verifying an equality of the first data and the fourth data, and verifying an equality of the current value of the variable and the initial value.

2. The method of claim 1, wherein the one of said first steps is determined randomly from among the plurality of first steps.

3. The method of claim 1, wherein the one of said second steps is determined randomly from among the plurality of second steps.

4. The method of claim 1, wherein the initial value is determined randomly prior to said storing of the initial value as the current value of the variable.

5. The method of claim 1, wherein the third data is the second data.

6. The method of claim 1, further comprising:
obtaining fifth data by applying a third cryptographic algorithm to the second data;
obtaining sixth data by applying a fourth cryptographic algorithm to the fifth data;
obtaining seventh data by applying, to the sixth data, a fifth cryptographic algorithm that is inverse of the fourth cryptographic algorithm; and
obtaining the third data by applying, to the seventh data, a sixth cryptographic algorithm that is inverse of the third cryptographic algorithm.

7. The method of claim 1, further comprising the following steps, the second data being used as the current data:
implementing a plurality of third steps, each comprised of obtaining a result by applying the first cryptographic algorithm to the current data and storing the result as a new current data; and
implementing a plurality of fourth steps, equal to the plurality of third steps, each comprised of obtaining an other result by applying the second cryptographic algorithm to the current data and storing the other result as the new current data,
said third data being the current data after implementation of said fourth steps.

8. The method of claim 1, wherein the first data represents a message or an initial word.

9. The method of claim 1, wherein the first algorithm is an encryption algorithm.

10. The method of claim 1, wherein the first algorithm uses a cryptographic key.

11. The method of claim 1, wherein the first algorithm is an AES algorithm.

12. The method of claim 1, further comprising:
when the verifying step verifies that the first data is equal to the fourth data and the current value of the variable is equal to the initial value during the verification step, emitting a piece of data obtained depending on the second data.

13. The method of claim 1, further comprising:
implementing a security action when, during the verifying step, either the first data differs from the fourth data or the current value of the variable differs from the initial value.

14. A device for cryptographic processing of first data, comprising a processor programmed to:
store an initial value in a variable as a current value of the variable, the initial value being different from the first data;
implement a plurality of first steps that each apply a first cryptographic algorithm in succession with one another, one of said first steps comprised of applying the first cryptographic algorithm to the first data and storing a result of said one of said first steps as second data, and all other ones of said first steps comprised of applying the first cryptographic algorithm to the current value of the variable in and applying each result therefrom to replace the current value of the variable;
implement a plurality of second steps, equal to the plurality of first steps, that each apply a second cryptographic algorithm in succession with one another, the second cryptographic algorithm being inverse of the first cryptographic algorithm, one of said second steps comprised of applying the second cryptographic algorithm to third data and storing a result of said one of said second steps as fourth data, and all other ones of said second steps each comprised of applying the second cryptographic algorithm to the current value of the variable and applying each result therefrom to replace the current value of the variable; and
verify an equality of the first data and the fourth data, and verify an equality of the current value of the variable and the initial value.

15. The device of claim 14, further comprising:
a cryptoprocessor,
wherein the first cryptographic algorithm and the second cryptographic algorithm are both implemented by the cryptoprocessor upon command of the processor.

16. A method for cryptographic processing of first data, comprising the following consecutive steps:
storing an initial value in a variable as a current value of the variable, the initial value being different from the first data;
implementing a plurality of first steps that each apply a first cryptographic algorithm in succession with one another, one of said first steps comprised of applying the first cryptographic algorithm to the first data and storing a result of said one of said first steps as second data, and all other ones of said first steps each comprised of applying the first cryptographic algorithm to the current value of the variable and applying a result therefrom to replace the current value of the variable;
implementing a plurality of second steps, equal to the plurality of first steps, that each apply a second cryptographic algorithm in succession with one another, the second cryptographic algorithm being inverse of the first cryptographic algorithm, one of said second steps comprised of applying the second cryptographic algorithm to third data and storing a result of said one of said second steps as fourth data, and all other ones of said second steps each comprised of applying the second cryptographic algorithm to the current value of the variable and applying a result therefrom to replace the current value of the variable; and verifying an equality of the first data and the fourth data, and verifying an equality of the current value of the variable and the initial value, wherein the one of said first steps is determined randomly from among the plurality of first steps.

17. The method of claim 16, wherein the one of said second steps is determined randomly from among the plurality of second steps.

* * * * *